(No Model.)
J. MILLS.
COMBINED PUMP AND MOTOR.
No. 340,343. Patented Apr. 20, 1886.
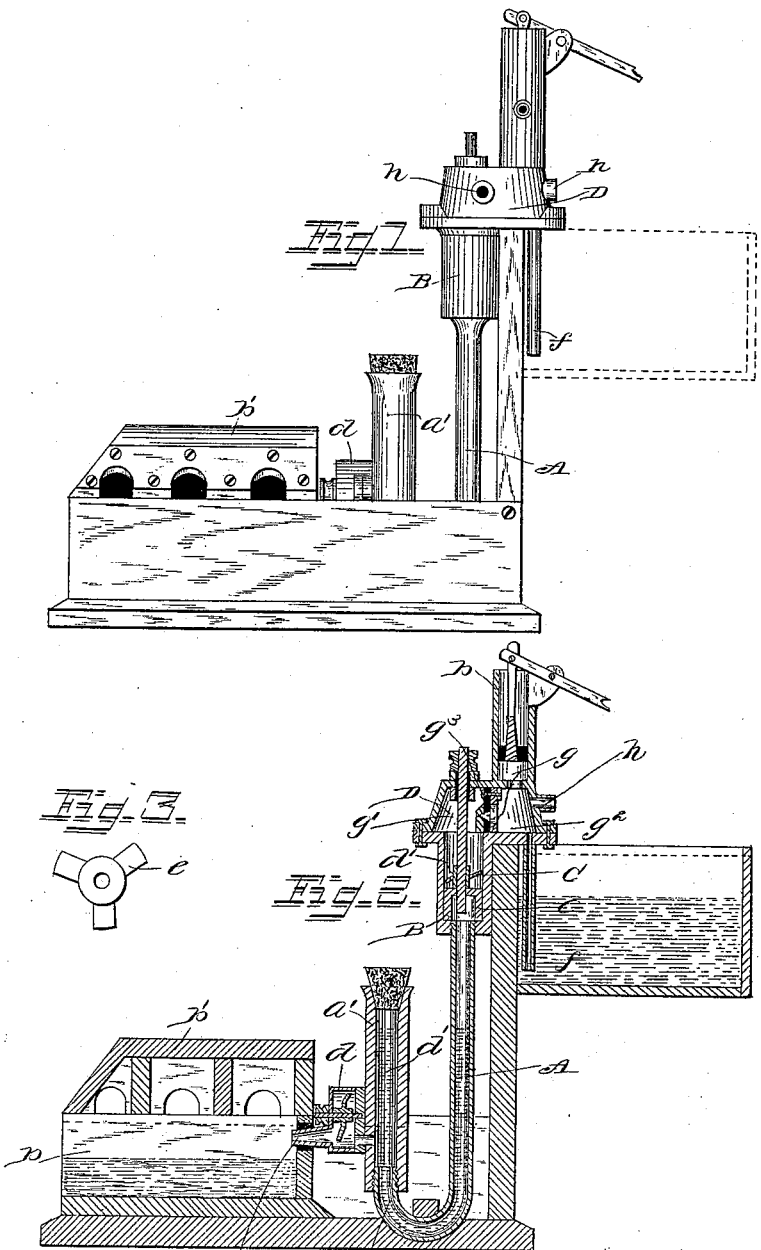

UNITED STATES PATENT OFFICE.

JOSEPH MILLS, OF CORNELL, ILLINOIS, ASSIGNOR OF ONE-HALF TO TOBIAS A. SPRAGUE, OF SAME PLACE.

COMBINED PUMP AND MOTOR.

SPECIFICATION forming part of Letters Patent No. 340,343, dated April 20, 1886.

Application filed September 9, 1885. Serial No. 176,633. (No model.)

*To all whom it may concern:*

Be it known that I, JOSEPH MILLS, a citizen of the United States of America, residing at Cornell, in the county of Livingston and State of Illinois, have invented certain new and useful Improvements in Combined Pumps and Motors, of which the following is a specification, reference being had therein to the accompanying drawings.

This invention has reference to improved means for supplying water to troughs for the use of cattle and other animals, or it may be utilized to maintain a supply of oil at the required level in the oil receptacle or vessel, while, in addition to the aforesaid purposes, it may be applied as a motor for water-wheels, and in connection therewith may be employed or used as a pump whenever occasion may require; and the invention consists in the combinations of parts and their construction, substantially as hereinafter more fully set forth and claimed.

In the accompanying drawings, Figure 1 is a side view of my invention. Fig. 2 is a sectional elevation thereof, and Fig. 3 is a detailed view.

In carrying out my invention I employ a siphon-pipe, A, with its lower horizontal portion suitably disposed to permit its shorter arm or leg, $a$, and upward extension $a'$, with its discharge-pipe $a^2$, to occupy a position contiguous to and to discharge into the trough $b$, the latter receiving water through this source, and holding the same for the use of cattle and other animals. The trough $b$ is provided with a covering or roof, $b'$, to exclude foreign substances from the water, while at its lower edges said roof is provided with openings, through which the cattle, hogs, and like animals may have access to the water. This arm $a$ of the siphon-pipe A, as above intimated, has an enlarged upward extension, $a'$, which has an upper open end closed by a plug, which extension serves as a reserve-pipe to hold a quantity or supply of water to raise the level of the water to about the level of that liquid in the reservoir or tank; or the well, where located in the side of a hill, for instance, from which the supply is obtained.

Upon one side of the extension $a'$, near its lower end, is or may be contrived a means or a casing, $d$, to contain a water-wheel, $d'$, whose shaft, projecting through said casing, is provided with a pulley to drive a belt for serving as a motor to drive or operate machinery, the water rising in the extension $a'$ from the siphon-arm $a$, and acting upon the buckets of the wheel in its passage to the discharge-pipe $a^2$, the latter connecting with one side of the said casing, as shown in Figs. 1 and 2. At the upper end of the other or longer arm or leg of the siphon A is also an enlarged upward extension, B, which contains a tri-legged apertured support or bearing, $e$, for the support of a second water-wheel, C, and the reception of the lower end of its shaft, furnishing a second motor-power, connection with which can be made as presently seen.

Upon the upper end of the extension-pipe B is disposed the vacuum-chamber D, up through and outside of which and its casing extends the upper end of the shaft of the water-wheel C, upon which upper or outer end of said shaft is designed to be secured a pulley to connect with a belt, which may be utilized to drive additional machinery. The vacuum-chamber D, it will be seen, occupies the highest possible plane to promote its efficiency in creating the necessary suction, together with the action of the water placed in the pipe $a'$, to lift the water into said chamber from the tank, reservoir, or well, from which latter said chamber receives or is supplied with the water or other liquid—as, for instance, oil—through the pipe $f$, with one end connected to the casing of said chamber, and its other end entering said tank, reservoir, or well. The longer arm or leg of the siphon must of course be of greater diameter than the receiving or supply pipe $f$, in order to maintain the vacuum created in the vacuum-chamber D to effect the automatic lifting of the liquid.

Within the chamber D is a partition, $g$, separating the same into two sub chambers or compartments, $g'\ g^2$, said partition having a valved opening, $g^3$, the function of which will appear further on.

The vacuum-chamber D may be provided with additional supply or receiving pipes applied at the openings $h$, while it may be also supplied with additional discharge openings or pipes.

Upon the casing of the vacuum-chamber D is secured the barrel of a pump, E, one among other purposes of which is to aid the action of the vacuum-chamber in an emergency or in case of its failure to act. The pump is disposed in a plane at one side of the partition g, while the valve of the opening $g^3$ of the said partition is caused to remain closed by ordinary means when the pump is used solely as a pump, in which case the water is discharged through the openings in the side of the vacuum-chamber D, the valve preventing the return of the water from the trough, which would otherwise occur by the action of suction in the pump chamber or compartment of the chamber D during such latter use of the pump. It is obvious that when the side openings of the vacuum-chamber are closed or are not discharging the action or pressure of the water lifted into the pump chamber or compartment, either when the pump is used to aid the action or suction of the vacuum-chamber, or when the latter is used alone, will act upon the valve of the opening $g^3$, and thus open said valve, (the water finding no other outlet,) and to escape by said valve and through said opening.

My invention is, as before stated, also adapted to maintain a flow of oil at a constant uniform level to the oil vessel or receptacle of a lamp, to keep the wick constantly saturated.

In order to exclude air from the vacuum-chamber D, the wheel-shaft opening in the top of its casing is designed to have a stuffing-box, which is to be packed with waste cotton, placed around said shaft, suitably oiled to lubricate the shaft.

The pump is provided with the usual plunger and discharge-spout, and its plunger is provided with an operating-handle.

In order to supply the watering-trough, (the receiving-pipe entering the reservoir, tank, or well,) water is put into the tank or reservoir to the height as indicated by shading therein, and into the longer leg of the siphon-pipe A and reserve pipe $a'$ to the height as also indicated by shading therein, when a flow will be effected into the said trough, which will be maintained until the water rises in the trough to the height of the dotted lines, the flow then ceasing. When the water has been removed or drank out by the cattle to the shading, the flow will again take place, and its intermittent flow or action will be kept up as long as the tank or reservoir contains water or until it is emptied. If water or liquid be placed in the tank to the height of the dotted line therein, the water or liquid need be placed in the siphon and reserve pipe to only the height of the dotted line crossing the same, which will render the flow automatic. Of course, during such flow or passage of water each of the water-wheels will be operated, when their power or motion through a belt, as previously stated, can be utilized to drive machinery. Either the pump or the reserve or extension pipe $a^2$ can be called into requisition should there be any failure of action of the siphon alone.

Having thus fully described my invention, what I claim, and desire to secure by Letters Patent, is—

1. The combination, with the siphon having an upward extension, the water-wheel carrying a pulley on its shaft contained within a casing on the discharge pipe, of the vacuum-chamber having sub-chambers connected by a valve, the water-wheel having its shaft extended beyond said casing and carrying a pulley, and the pipe connected to said casing and entering the tank or reservoir, substantially as shown and described.

2. The combination, with the vacuum-chamber, of the water-wheel having its shaft passed through the casing of said vacuum-chamber and carrying a pulley, and having a stuffing or lubricant box, and the tri-legged apertured support or bearing contained within an enlarged upward extension of the siphon, substantially as shown and described.

3. The combination of the siphon, the casing connected to an extension thereof, the water-wheel secured within said casing carrying a pulley on its shaft, the enlarged upward extension, the tri-legged apertured support, the water-wheel having its shaft provided with a pulley, and the vacuum-chamber having a pipe leading to the tank or reservoir, substantially as shown and described.

4. The siphon-pipe having its shorter leg or arm provided with an upwardly-extended pipe having a casing securing a water-wheel with its shaft carrying a pulley, in combination with the vacuum-chamber connected to its longer leg or arm, and the supply or receiving pipe connected to said vacuum-chamber, substantially as and for the purpose specified.

In testimony whereof I affix my signature in presence of two witnesses.

JOSEPH MILLS.

Witnesses:
E. A. JAMISON,
THOMAS N. YOUNG.